United States Patent [19]
Nakamura

[11] 3,922,444
[45] Nov. 25, 1975

[54] SLIDING MEMBER
[75] Inventor: Yoshikatsu Nakamura, Yokohama, Japan
[73] Assignee: Nippon Piston Ring Co., Ltd., Tokyo, Japan
[22] Filed: July 13, 1973
[21] Appl. No.: 378,862

[30] Foreign Application Priority Data
Aug. 30, 1972  Japan.............................. 47-86325

[52] U.S. Cl. ............... 428/457; 29/196.6; 427/422; 427/427; 428/471; 428/539
[51] Int. Cl.² ...................... B23P 3/00; C23C 7/00
[58] Field of Search.......... 117/105, 105.2, 93.1 PF, 117/127; 308/241; 29/196.6; 427/422, 427, 471, 539, 457

[56] References Cited
UNITED STATES PATENTS
3,055,769   9/1962   Herron et al. .................... 117/105.2
3,343,362   9/1967   Lunsford ...................... 117/93.1 PF
3,625,717   12/1971  Grubba et al. .................... 117/105.2

Primary Examiner—Mayer Weinblatt
Assistant Examiner—Edith R. Buffalow
Attorney, Agent, or Firm—Sughrue, Rothwell, Mion, Zinn & Macpeak

[57] ABSTRACT

A sliding member having a sliding surface layer produced by spraying on a surface of a base body a mixture composed of one or more metallic compounds selected from a group consisting of metal oxide, metal carbide and self-fluxing metal and $Fe_3O_4$ dispersed in said metallic compounds in amount of more than 5% of the latter.

4 Claims, 3 Drawing Figures

SLIDING MEMBER

BACKGROUND OF THE INVENTION

1. Field of the Invention

This invention relates to an improvement in a sliding member required to have the excellent scuffing and wear resistances such as the piston ring or cylinder liner for the internal combustion engine.

2. Description of the Prior Art

It is well known that one or more peripheral grooves are provided on an outer sliding surface of the piston ring, a mixture composed of $Fe_3O_4$ powder and sodium silicate as the binder is filled in said grooves and then the filler material in the grooves is thermo-set by heating. This process is intended to improve the scuffing and wear resistances of piston pistono ring, and the obtained piston ring is designated as "ferrox insert ring."

The ferrox insert ring can be used safely under such severe condition as often causes scuffing, since the lubricating oil impregnated in the ferrox insert part reduces the friction between the piston ring and the cylinder. This piston ring, however, can not keep its scuffing and wear resistances for long period of time, since the binding force of the sodium silicate (for the hard $Fe_3O_4$ particles) is not so strong and the hardness of the filler material as the whole is not so high.

On the other hand, the ferrox treatment to improve the break-in property between the piston ring and the cylinder is also known, which is characterized by forming a film of $Fe_3O_4$ on the sliding surface of the piston ring. This $Fe_3O_4$ film, however, is very thin and will removed away from the piston ring surface during break-in period before the piston ring is subjected to the normal operating conditions. Accordingly, this piston ring is not durable for long usage.

We, the inventors, have already developped the sliding member having the surface sliding layer of $Fe_3O_4$ sprayed and exhibiting the wear and scuffing resistances far better than that of the conventional sliding member, by making use of the high hardness of the $Fe_3O_4$ particles and the feature of the metal spraying process. The invention on this sliding member was applied as a U.S. Pat. application Ser. No. 311,618.

Therefore, this invention is intended to provide an improved sliding member having the hardness, wear resistance and scuffing resistance more excellent than that of the sliding member described in said Patent Application.

SUMMARY OF THE INVENTION

The feature of this invention is to form a scuffing and wear resistant sliding surface layer on the base body surface by spraying thereon a mixture composed of one or more metallic compounds selected from a group consisting of metal oxide, metal carbide and self-fluxing metal and $Fe_3O_4$ particles dispersed in said metallic compounds in amount of more than 5% of the latter.

The word "metal oxide" means, for example, $Al_2O_3$ and $Cr_2O_3$; "metal carbide" means, for example, $Cr_3C_2$ and WC; and "self-fluxingmetal" means, for example, Ni-B-Si alloy, Ni-Cr-B-Si alloy, Ni-Co-Cr-B-Si alloy and Ni-W-B-Si alloy. The hardness of the layer produced by spraying the mixture of the metallic compound and $Fe_3O_4$ particles on the base body surface is Hv(30) 700–1000, which is higher than the hardness (Hv(30) 700) of the $Fe_3O_4$ only sprayed layer. Besides, the metallic compounds in the mixture will bind the $Fe_3O_4$ particles and impart the toughness to the sprayed layer, thus forming the favorable sliding member having the high hardness and abrasion resistance.

Now, more particular embodiment of this invention will be described with reference to the following Examples and drawings.

BRIEF EXPLANATION OF ACCOMPANIED DRAWINGS

FIG. 1 is a graph showing a relation between the $Fe_3O_4$ content in the sprayed layer and wear loss of the latter.

FIG. 2 shows an outline of the rotating wear tester used for examining the wear loss of the sprayed layer, and FIG. 3 shows an wear amount of the piston ring of this invention and that of the conventional piston ring having the Mo sprayed surface layer, wherein numeral 1 is a specimen numeral 2 is a turn table, No. 1 is a piston ring in the Example 1 of this invention, No. 2 is a piston ring in the Example 2, No. 3 is a piston ring in the Example 3 and No. 4 is a piston ring having the sprayed surface layer or pure Mo.

DETAILED DESCRIPTION OF THE PREFERRED EMBODIMENT

Figure 1:
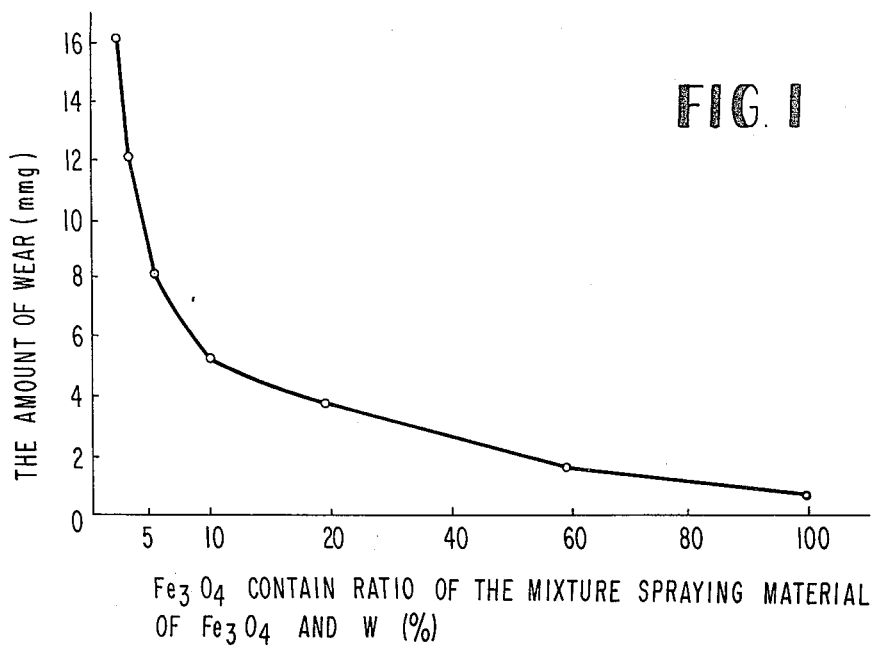

If the $Fe_3O_4$ content in the sprayed layer is not more than 5%, the wear increases abruptly and the intended high wear resistance is not obtained. That the $Fe_3O_4$ content exceed 5% is clarified from the FIG. 1 which shows the change of the wear amount of the sprayed layer in accordance with the change of the $Fe_3O_4$ content in the spraying mixture of W and $Fe_3O_4$. In the graph the wear loss increases abruptly when the $Fe_3O_4$ content is reduced below 5%.

Figure 2:
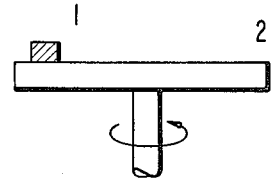

The wear amount of the sprayed layer was measured by a rotating wear tester shown in the FIG. 2. The sliding member specimen 1 having the sprayed layer is mounted and thrusted on a turn table 2 as supplying lubricating oil to the mutual contact face between the specimen and the turn table 2. The testing conditions are as follows;

| | |
|---|---|
| velocity of the turn table: | 5 m/sec. |
| running length: | 500 Km. |
| pressure: | 35 kg/cm². |
| material of the turn table: | cast iron (FC 25) |
| lubricating oil: | daphni oil 50% and white lamp oil 50% |

Now, more specific embodiments of this invention will be explained with reference to some Examples. The sprayed layer in each example was formed under the following spraying conditions;

| | |
|---|---|
| spraying gun used: | Meteco 3M type spraying gun |
| $N_2$ gas pressure: | 50 lb/in². |
| $N_2$ gas flow volume: | 150 ft³/hr. |
| $H_2$ gas pressure: | 50 lb/in². |
| $H_2$ gas flow volume: | 10 ft³/hr. |
| electric current: | 500 A |
| distance between the spraying gun and the test specimen: | 4 in. |

EXAMPLE 1

A mixture composed of $Fe_3O_4$ powder 50% and $Cr_2O_3$ powder 50% was sppraying on the sliding surface of a cast iron piston ring composed of T.C. 3.5%, Si 2.6%, Mn 0.6% and Fe 93.3% to form a sprayed layer having the thickness of 0.3 mm. The HV(30) hardness of the resultant sprayed layer was 1000.

EXAMPLE 2

A mixture composed of $Fe_3O_4$ 60% and $Cr_3C_2$ 40% was sprayed on the sliding surface of the cast iron piston ring as described in the Example 1 to form a sprayed surface layer of 0.3 mm thickness. The Hv(30) hardness of the resultant sprayed layer was 750.

EXAMPLE 3

A mixture composed of $Fe_3O_4$ 70% and self-fluxing alloy 30% was sprayed on the outer peripheral surface of the piston ring as described in the Example 1 to form the sprayed surface layer having the thickness of 0.3 mm. The resultant sprayed layer had the Hv(30) hardness of 700.

Figure 3:
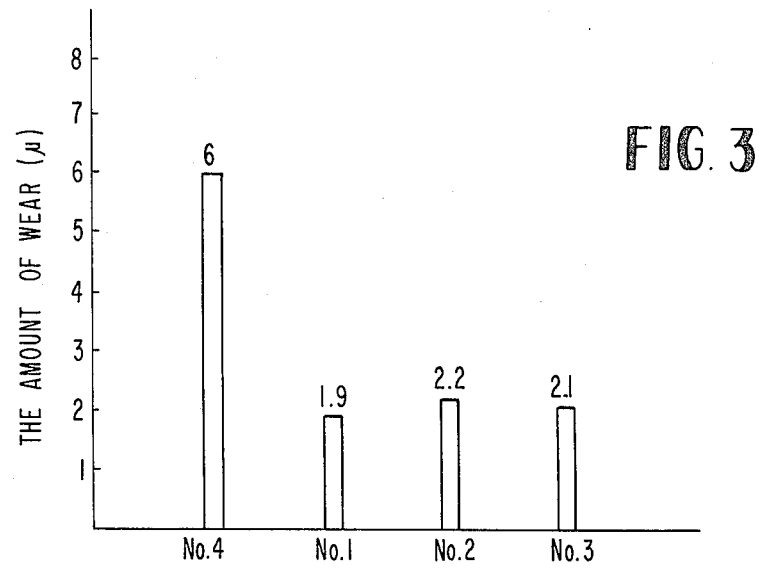

The piston ring specimen No. 1, No. 2 and No. 3 obtained in accordance with the Examples 1–3, respectively, and another piston ring specimen No. 4 having the sprayed layer of pure Mo (0.3 mm thickness) wear subjected to the actual engine test under such severe conditions as described below to examine the wear resistance. The test results were shown in the FIG. 3, wherein the wear amount of the piston ring specimen No. 1 - No. 4 was 1.9 $\mu$, 2.2 $\mu$, 2.1 $\mu$ and 6 $\mu$, respectively. This means that the wear resistance of the piston ring of this invention is excellent as compared with that of the conventional piston ring.

| THE CONDITIONS OF THE ENGINE TEST | | |
| --- | --- | --- |
| ENGINE USED; | forcively air-cooled horizontally confronted 2 cylinder 4 cycle engine. | |
| | inner diameter X stroke; | 83 mm × 73 mm |
| | total exhausting volume; | 790 cc |
| | maximum output; | 36 ps/4600 rpm. |
| RUNNING CONDITIONS; | rotation number; | 500 rpm. |
| | horse power; | 22 ps |
| | load; | 7 Kg. |
| | running time; | 50 hr. |
| | oil temperature; | 110° ± 10°C |
| | cylinder alloy; | cast iron (FC 25) |

As particularly described above, this invention provides the sliding member having the excellent wear resistant sliding surface.

While this invention has been described with reference to particular embodiments thereof, it will be understood that the numerous modifications may be made by those skilled in the art without actually departing from the scope of the invention.

Therefore, the appended claim is intended to cover all such equivalent variations as coming within the true spirit and scope of this invention.

What is claimed is:

1. A metal sliding member having a sliding surface layer produced by spraying on a surface of a base body a mixture composed of one or more metallic materials selected from the group consisting of metal oxides, metal carbides, and self-fluxing metal alloys, with $Fe_3O_4$ dispersed in the one or more metallic compounds in an amount of more than 5% of the one or more metallic compounds.

2. The metal sliding member of claim 1 wherein the metal oxide is $Al_2O_3$ or $Cr_2O_3$.

3. The metal sliding member of claim 1 wherein the metal carbide is $Cr_3Cr_2$ or WC.

4. The metal sliding member of claim 1 wherein the self-fluxing metal alloy is Ni-B-Si alloy, Ni-Cr-B-Si alloy, Ni-Co-Cr-B-Si alloy or Ni-W-B-Si alloy.

* * * * *